No. 616,340. Patented Dec. 20, 1898.
P. McA. LEONARD.
COMBINED HAY RAKE AND LOADER.
(Application filed May 25, 1897.)
(No Model.) 2 Sheets—Sheet 1.
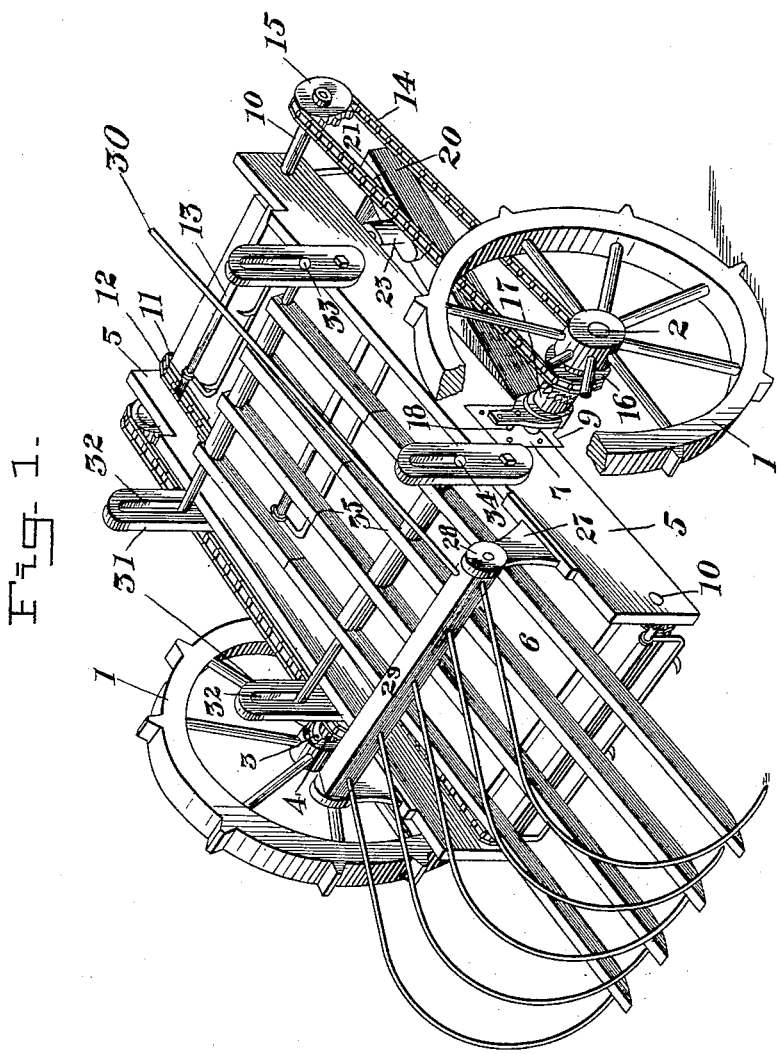
Witnesses
Chas. P. Heinemann.
Victor J. Evans
Inventor
Peter M. Leonard.
By John Wedderburn
Attorney

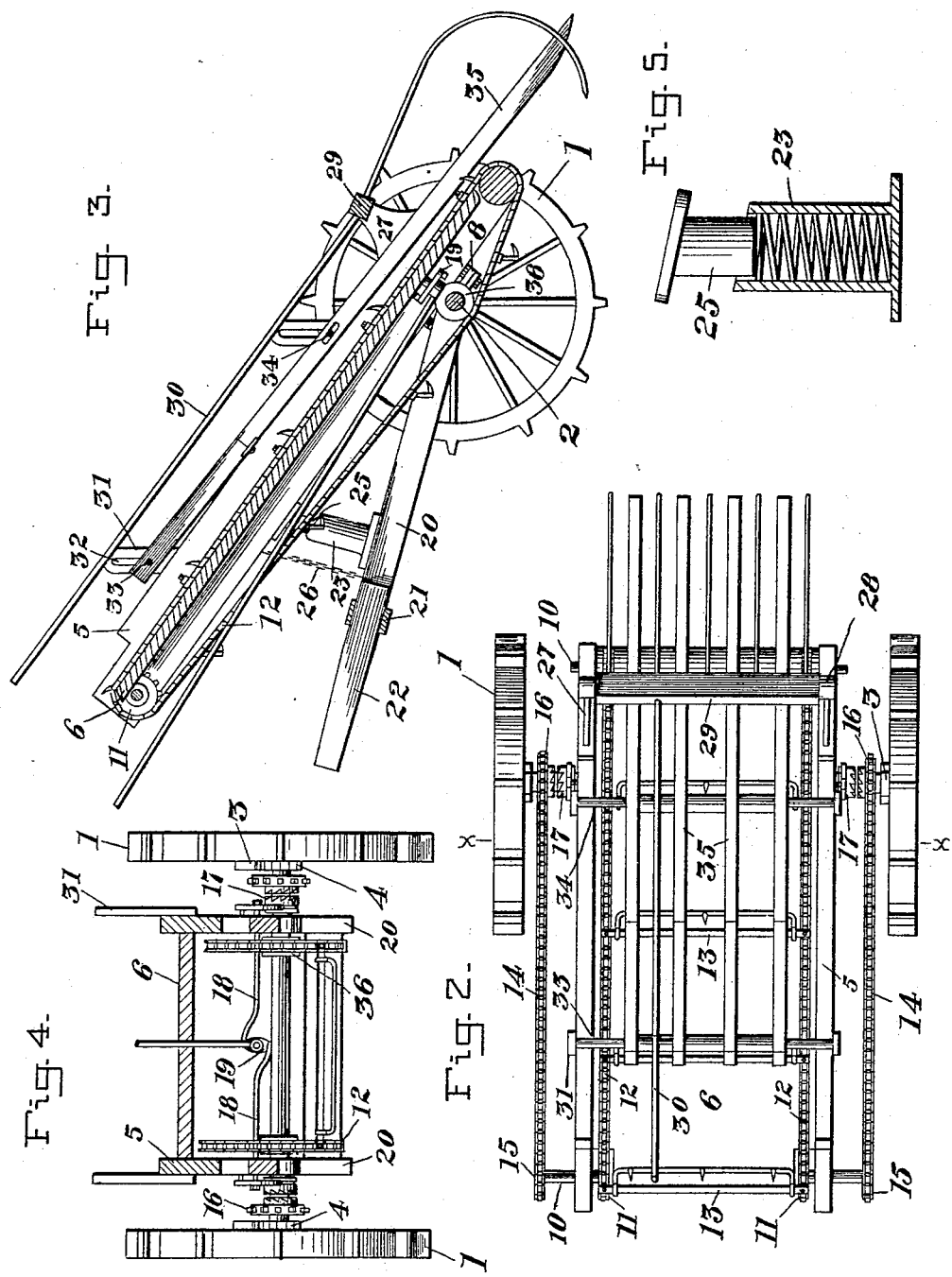

UNITED STATES PATENT OFFICE.

PETER McAULLIFFE LEONARD, OF THORP, WISCONSIN.

COMBINED HAY RAKE AND LOADER.

SPECIFICATION forming part of Letters Patent No. 616,340, dated December 20, 1898.

Application filed May 25, 1897. Serial No. 638,032. (No model.)

*To all whom it may concern:*

Be it known that I, PETER McAULLIFFE LEONARD, of Thorp, in the county of Clark and State of Wisconsin, have invented certain new and useful Improvements in a Combined Hay Rake and Loader; and I do hereby declare the following to be a full, clear, and exact description of the invention, such as will enable others skilled in the art to which it appertains to make and use the same.

My invention is an improvement in that class of hay rakers and loaders in which a rake and endless traveling carrier are mounted on an inclined frame supported by transporting-wheels.

The invention is embodied in the construction and combination of parts hereinafter set forth.

In the drawings forming part of this specification, Figure 1 is a perspective view of a combined hay rake and loader constructed in accordance with my invention. Fig. 2 is a plan view of the machine. Fig. 3 is a longitudinal vertical section. Fig. 4 is a transverse sectional view on the line $x\,x$ of Fig. 2. Fig. 5 is a detail sectional view through one of the buffers.

Referring to the drawings by numerals, 1 1 designate the supporting-wheels of the machine, which are loosely mounted upon an axle 2 and turn said axle upon their forward movement through the intervention of a spring-actuated pawl 3, carried by the supporting-wheels engaging a ratchet-wheel 4, keyed to the ends of the axle. The supporting-wheels are provided on their peripheries with the usual projections or transverse ridges that insure a better hold upon the ground.

Mounted upon the axles of the supporting-wheels is an elevator-frame, consisting of the side pieces 5 5, connected to each other by a horizontal partition-board 6, the central portion of the upper end of which is extended, as shown, and the side edges terminate near the ends of the side pieces. The particular manner of connecting this frame to the axle consists in letting into the side pieces thereof a plate 7, having a recess in its lower end which fits over the axle, and beyond said recess are projections 8 to receive a section or casting 9, which embraces the other part of the axle and is bolted to the plate 7, as shown.

Between the ends of the side pieces of the elevator-frame are journaled transverse shafts 10 10, the upper shaft having sprocket-wheels 11 11, located within the frame and engaging sprocket-chains 12 12, which pass therefrom over the shaft 10 at the rear end of the frame, this last-mentioned shaft being enlarged between the side pieces to form drums. The sprocket-chains have slats 13 extending between the same and provided with strips having projecting teeth, the said chains and strips forming the endless apron or carrier-belt and travel over the board 6. The endless apron or carrier is driven from the axle of the supporting-wheels by means of sprocket-chains 14, which pass over sprocket-wheels 15 at the opposite ends of the upper transverse shaft 10 and over sprocket-wheels 16, loosely mounted on the axle. The sprocket-wheels 16 are provided with clutch-faces, which engage clutch-sections 17 in sliding engagement with the axle and connected to rotate therewith by means of the usual spline or feather, the said clutch-sections being connected by rods 18 to a bell-crank lever 19, located near the center at the under side of the elevator-frame, the lever being operated by suitable connections to move the clutch-sections out of engagement with the sprocket-wheels when it is desired to stop the operation of the endless apron or carrier-belt. The connecting-rods pass through apertures therefor in the plates which form the bearing between the frame and axle.

20 20 designate the side bars or pieces by which the machine is connected to a wagon, the said side bars being connected to each other at their forward ends by the cross-bar 21, to which is rigidly attached a tongue 22, the said tongue providing for hitching horses directly thereto. These bars are provided with buffers consisting of sockets 23, having springs seated therein upon which rest depending pins 25, carried by the elevator-frame. This provides for an easy movement of the frame, so that it will receive no sudden jars when it passes over uneven ground. The upward movement of the elevator-frame with respect to the connecting-bars is limited by means of a strap or flexible connection 26 connected thereto.

Upon the side pieces of the elevator-frame are mounted standards 27, forming sockets or bearings 28 at their upper ends, in which is mounted a transverse bar 29, carrying the spring rake-teeth, said teeth being curved and extended beyond the rear end of the machine, as shown. The cross-bar carrying the rake-teeth is loosely mounted within its bearings, and the teeth are brought into proper contact with the ground by gravity. These rake-teeth are raised and lowered by the lever 30.

Extending from the side pieces of the elevator-frame and inclined slightly rearward with respect thereto are standards 31, the same being practically vertical and having slots 32 in their inner sides, in which are seated the ends of transverse shafts 33 and 34, extending across the frame above the carrier-belt. To these shafts are connected arms 35, which project between the rake-teeth and beyond the same, the outer ends being curved on their under sides, as shown. These bars are preferably jointed between the shafts, and their forward ends normally rest above the endless apron or carrier-belt in order to provide for holding the hay thereon in its passage up to the wagon, being brought into such engagement by gravity. In order to permit this movement of the presser-bars, they are slotted to engage the shaft adjoining the rake, as shown.

In the operation of a machine constructed as herein shown and described it is connected to the rear end of the wagon, and when drawn across the field the rake-teeth will act to gather the hay, which collects thereon and is caught up by the slats of the endless apron or carrier-belt and carried up between the side pieces of the elevator-frame and dumped into the wagon, the rearwardly-projecting arms or presser-bars acting to prevent the hay being blown from the machine during its progress up the same. The described presser-frame thus acts automatically by gravity, it being free to rise and fall bodily as a whole or at either end independently, as the case may be.

When the machine is used to gather an abundant harvest, a larger number of slats are used in connection with the carrier-belt, and such slats are detachably secured in place.

In order that the sprocket-chains of the endless belt may have a bearing under the frame, the axle is provided with collars 36, keyed thereto so as to revolve and prevent any friction of the parts at this point. It will be noted that a forward movement of the machine will move the carrier-belt as the supporting-wheels turn the shaft or axle through the intervention of the ratchets and pawls, the motion of the shaft being transmitted to the sprocket-wheels 16 by the sliding clutch-sections, which engage therewith, the said sprocket-wheels 16 being connected to the driving-shaft of the endless carrier-belt, as hereinbefore described. The belt can be quickly thrown out of operation by manipulating the bell-crank lever to move the clutch-sections out of engagement with the sprocket-wheels, which provides for throwing the parts out of operation when transporting the machine from place to place. It will also be noted that a backward movement of the machine will not turn the axle, as the pawls upon the supporting-wheels will escape over the ratchet-wheels on said axle.

From the foregoing description, in connection with the accompanying drawings, the construction and operation of my improved combined hay rake and elevator will be readily understood, and it will be apparent that the device, though comparatively simple and cheap in construction, also possesses the more important advantage of being effective in operation.

Having thus described my invention, what I claim as new, and desire to secure by Letters Patent, is—

In a combined hay rake and loader, a frame mounted upon an axle carrying supporting-wheels, an endless apron or carrier-belt mounted within the frame and driven from the axle, and a rake pivoted in the rear portion of the frame; together with slotted standards carried by the frame, shafts or cross-bars bearing at their ends in slotted standards, and arms or presser-bars engaging the cross-bars or shafts and jointed between the same, substantially as shown and for the purpose set forth.

In testimony whereof I have signed this specification in the presence of two subscribing witnesses.

PETER McAULLIFFE LEONARD.

Witnesses:
ANNA MARTIN,
MAX OPELT.